UNITED STATES PATENT OFFICE.

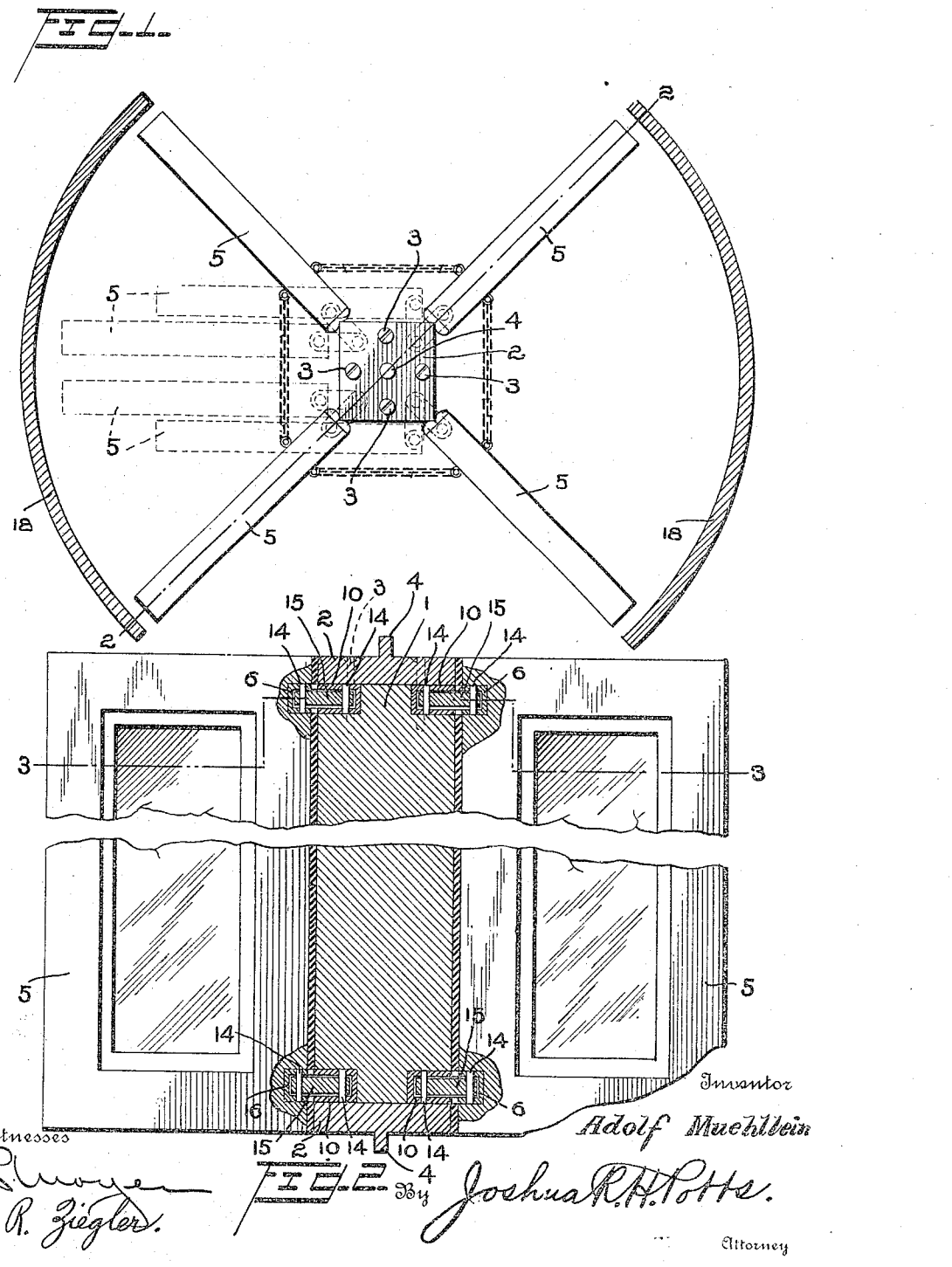

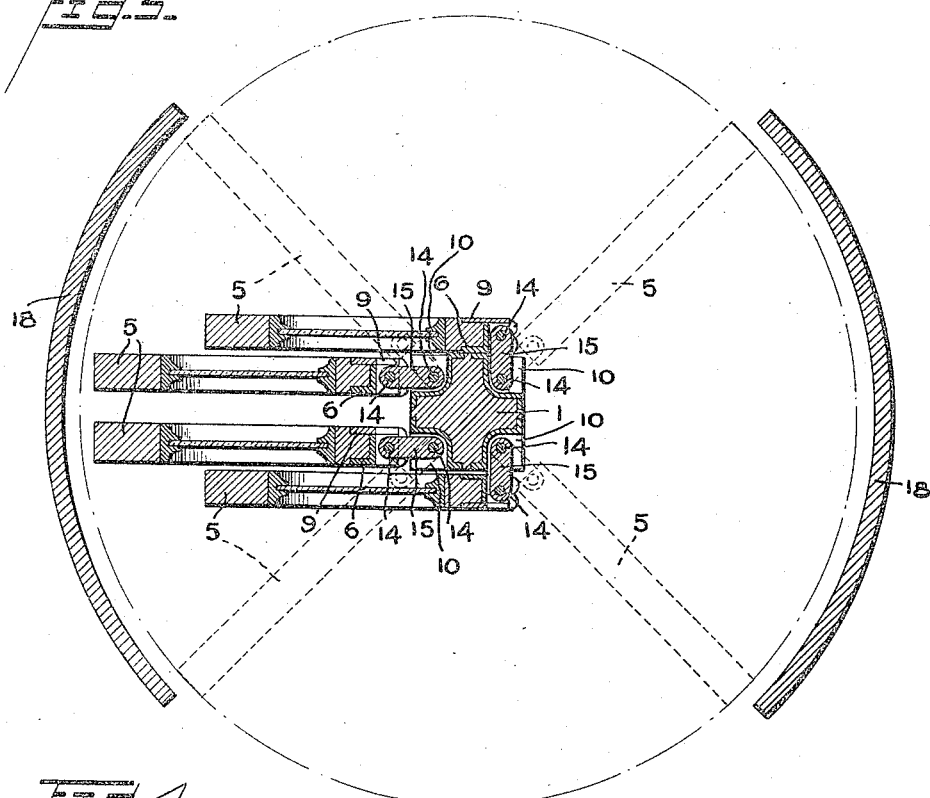
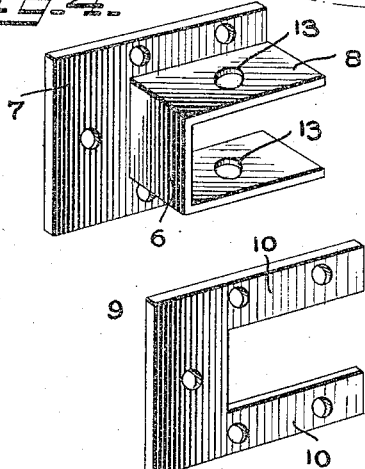
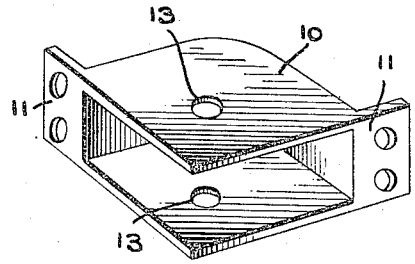

ADOLF MUEHLBEIN, OF CHICAGO, ILLINOIS.

HINGE FOR REVOLVING DOORS.

1,195,842.  Specification of Letters Patent.  Patented Aug. 22, 1916.

Application filed March 28, 1913. Serial No. 757,348.

*To all whom it may concern:*

Be it known that I, ADOLF MUEHLBEIN, a former subject of the Emperor of Germany, who has declared his intention of becoming a citizen of the United States, residing at Chicago, in the county of Cook and State of Illinois, have invented certain new and useful Improvements in Hinges for Revolving Doors, of which the following is a specification.

My invention relates to improvements in hinges for revolving doors, the object of the invention being to so connect the several wings of the door with the center spindle that the wings may be swung into position in parallelism so as to occupy but relatively small space.

A further object is to provide an improved hinge mounting between a plurality of wings and an angular spindle, which permits the wings to be readily moved into position at right angles to each other or into position parallel with each other.

With these and other objects in view, the invention consists in certain novel features of construction and combinations and arrangements of parts as will be more fully hereinafter described and pointed out in the claim.

In the accompanying drawings: Figure 1 is a plan view illustrating a revolving door equipped with hinges embodying my invention, the door being shown in normal operative position. Fig. 2 is a fragmentary view in vertical section on the line 2—2 of Fig. 1. Fig. 3 is a view in section on the line 3—3 of Fig. 2, but showing in full lines the several wings of the door in parallelism, and in dotted lines the normal position of said wings. Figs. 4 and 5 are perspective views illustrating the two members of one of the metal socket pieces 6, and Fig. 6 is a perspective view of one of the metal socket pieces 10.

In the drawings I have illustrated my invention applied to a revolving door provided with a central angular spindle 1 having metal plates 2 secured to the respective ends thereof by screws 3, and gudgeons 4 on said plates provide journals to afford rotary mounting for the spindle.

Connected to the spindle 1 are four wings 5 which may be of any desired form, and which are precisely alike in construction. Each wing 5 adjacent its upper and lower end is mortised for the reception of metal socket pieces 6. These metal socket pieces are of two members, one member shown in Fig. 4 comprising a plate 7 having integral flanges 8 to fit within the mortised portion of the wing and against which, at the opposite side of the wing, the other member 9 constituting a plate is rigidly secured.

The plates 7 and 9 may be secured to the wing in any desired manner, openings 10' being shown for the reception of securing devices.

The spindle 1 at its ends is recessed to receive metal socket pieces 10, one of which is shown in perspective in Fig. 6. These socket pieces 10 are of somewhat rectangular form having perforated ears 11 at their ends for the reception of securing devices (not shown).

The upper and lower flanges 8, and the upper and lower members of socket pieces 10 are provided with openings 13 to receive pivot pins 14 which are projected through the ends of links 15. The links 15 therefore connect the wings with the spindle, and it will be noted that the socket pieces 10 are in the corners or angles of the spindle, so that all of the doors may be positioned at the angles of the spindle.

The socket pieces 10, as above set forth, are of general rectangular formation, so that the links may be swung through an arc of approximately ninety degrees, so that the wings may be positioned at either of two sides of the spindle 1.

When the doors are so positioned, they occupy but relatively small space both for storage and shipment.

I have not attempted to illustrate any particular formation of casing for use in connection with my improved door, merely illustrating arcs 18 with which, of course, the several wings will have some sort of flexible weather stripping (not shown) when the device is in use.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

In a device of the class described, a hinge comprising two socket members and a connecting link having its ends pivotally mounted in said socket members respectively, one of said socket members having three sides open and the other socket member having two adjacent sides open and two adjacent sides closed and said closed sides forming abutments to limit the swing of said link, substantially as described.

In testimony whereof I have signed my name to this specification in the presence of two subscribing witnesses.

ADOLF MUEHLBEIN.

Witnesses:
JOSHUA R. H. POTTS,
ARTHUR A. OLSON.

Copies of this patent may be obtained for five cents each, by addressing the "Commissioner of Patents, Washington, D. C."